US012722613B2

(12) United States Patent
Jiang

(10) Patent No.: US 12,722,613 B2
(45) Date of Patent: Sep. 1, 2026

(54) FLEXIBLE TRANSMISSION-BASED FRONT PASSENGER-SIDE BRAKE CONTROL DEVICE AND FLEXIBLE TRANSMISSION-BASED FRONT PASSENGER-SIDE OPERATING SYSTEM FOR MOTOR VEHICLE

(71) Applicant: Jianping Jiang, Shanghai (CN)

(72) Inventor: Jianping Jiang, Shanghai (CN)

( * ) Notice: Subject to any disclaimer, the term of this patent is extended or adjusted under 35 U.S.C. 154(b) by 414 days.

(21) Appl. No.: 18/287,998

(22) PCT Filed: May 31, 2021

(86) PCT No.: PCT/CN2021/097144
§ 371 (c)(1),
(2) Date: Oct. 23, 2023

(87) PCT Pub. No.: WO2022/227199
PCT Pub. Date: Nov. 3, 2022

(65) Prior Publication Data

US 2024/0198988 A1 Jun. 20, 2024

(30) Foreign Application Priority Data

Apr. 26, 2021 (CN) ......................... 202110451435.8

(51) Int. Cl.
*B60T 11/04* (2006.01)
*B60T 7/04* (2006.01)

(52) U.S. Cl.
CPC ............... *B60T 11/046* (2013.01); *B60T 7/04* (2013.01)

(58) Field of Classification Search
CPC ............. B60T 11/046; B60T 7/04; B60T 7/06
(Continued)

(56) References Cited

U.S. PATENT DOCUMENTS

| | | | | |
|---|---|---|---|---|
| 7,207,238 B2 * | 4/2007 | Feng | ........................ | G05G 1/34 74/562.5 |
| 9,707,941 B2 * | 7/2017 | Miao | ......................... | B60T 7/06 |
| 2014/0311276 A1 | 10/2014 | Miao | | |

FOREIGN PATENT DOCUMENTS

| | | |
|---|---|---|
| CN | 101901557 A | 12/2010 |
| CN | 104097510 A | 10/2014 |

(Continued)

OTHER PUBLICATIONS

International Search Report and Written Opinion mailed Aug. 13, 2021 in corresponding PCT application No. PCT/CN2021/097144.

*Primary Examiner* — Christopher P Schwartz
(74) *Attorney, Agent, or Firm* — Nields, Lemack & Frame, LLC

(57) ABSTRACT

A flexible transmission-based front passenger-side brake control device and a flexible transmission-based front passenger-side operating system for a motor vehicle are provided. The front passenger-side brake control device comprises a base assembly, a front passenger-side brake pedal assembly, a master brake pedal clamping assembly, a front passenger-side accelerator pedal, a master accelerator pedal clamping assembly, a brake cable, an accelerator cable, an incompressible brake flexible force transmission sleeve and an accelerator flexible force transmission sleeve; the brake cable, the brake flexible force transmission sleeve, the accelerator cable and the accelerator flexible force transmission sleeve has a sufficient margin in length and can initially reach a loose condition.

10 Claims, 5 Drawing Sheets

(58) Field of Classification Search
USPC ............. 74/512, 560, 562.5; 188/2 D; 303/2
See application file for complete search history.

(56) References Cited

FOREIGN PATENT DOCUMENTS

| | | | |
|---|---|---|---|
| CN | 204020857 | U | 12/2014 |
| CN | 205916123 | U | 2/2017 |
| CN | 108045361 | A | 5/2018 |
| CN | 210760725 | U | 6/2020 |
| JP | 2018-184122 | A | 11/2018 |
| KR | 2005-0043373 | A | 5/2005 |

* cited by examiner

FLEXIBLE TRANSMISSION-BASED FRONT PASSENGER-SIDE BRAKE CONTROL DEVICE AND FLEXIBLE TRANSMISSION-BASED FRONT PASSENGER-SIDE OPERATING SYSTEM FOR MOTOR VEHICLE

This patent application is a national stage application of International Patent Application No. PCT/CN2021/097144, filed on May 31, 2021, which claims priority of Chinese Patent Application No. 202110451435.8, filed on Apr. 26, 2021, both of which are incorporated by references in their entireties.

TECHNICAL FIELD

The present disclosure relates to a front passenger-side operating device for a motor vehicle, in particular to a flexible transmission-based front passenger-side brake control device and a flexible transmission-based front passenger-side operating system for a motor vehicle, and belongs to the technical field of motor vehicles.

BACKGROUND

With the rapid development of automobile industry and the improvement of people's living standards, automobiles have entered thousands of households. According to a survey conducted by the National Bureau of Statistics of China, China has become a country with large automobile production and consumption, and the number of motor vehicles in China is about 100 million. According to traffic laws and regulations, ordinary people have to pass the required examinations before becoming qualified drivers, and many people choose to study at driving schools in order to master driving skills. Driving practice is a necessary practical part of learning to drive, and driving schools generally have coach cars for students to practice. Due to limited time in contact with cars, students often feel at a loss after getting on the cars, and sometimes accelerator pedals are mistakenly used as brake pedals, leading to accidents. The existing coach cars are equipped with auxiliary braking devices. Once the student operates in fault, the coach sitting in the front passenger-side seat can brake urgently through the auxiliary braking device to prevent accidents. In addition, obtaining a driving license through examinations after driving school training does not mean becoming a skilled vehicle driver. Every year, a large number of "driving license drivers" have become invisible "road killers", and major fatal road traffic safety accidents caused by unskilled driving skills frequently occur. Therefore, it is proposed that the existing private cars can be equipped with car braking devices for front passengers like coach cars, so that new hands can be accompanied by old hands sitting in the front passenger-side seat when driving. In case of an emergency, the old hands can take decisive braking measures, thus effectively preventing and reducing traffic accidents.

The Chinese utility model patent "Simple Braking Device for Front Passenger" (ZL201420456563.7) discloses a braking device for a front passenger. Referring to FIG. 1, a brake pedal for a front passenger is pressed down to rotate a main lever, and then a brake rocker arm and a brake roller are driven to press down a brake pedal for a driver, thus realizing the braking of a motor vehicle through the operation of the front passenger. However, components of the braking device for a front passenger are respectively installed on a carriage floor at a driver-side position and a front passenger-side position, and a raised center console is arranged between the driver-side position and the front passenger-side position in most motor vehicles, referring to FIG. 5, which brings great difficulties for the installation of the braking device for a front passenger mentioned in the above patent. The rigid transmission component, i.e., the main lever, is difficult to cross the high center console, so the installation of the braking device for a front passenger sometimes needs to destroy the original carriage structure of the motor vehicle.

At present, there are also cable-type front passenger-side braking devices using steel wire ropes in the market. Although the defect that the rigid transmission front passenger-side braking devices are difficult to install is overcome, the strength of the steel wire ropes as transmission parts is limited. In some special emergency abnormal situations, the sudden excessive force on a front passenger-side brake pedal often leads to the breakage of the steel wire ropes, so that it is difficult to avoid accidents.

In addition, the existing automobile braking device for a front passenger has no function of operating and controlling a master accelerator by a front passenger yet.

SUMMARY

The present disclosure aims at overcoming the disadvantages of an existing automobile braking device for a front passenger, providing a flexible transmission-based front passenger-side brake control device and a flexible transmission-based front passenger-side operating system for a motor vehicle. An axially incompressible high-strength flexible pipe is used as a force transmission component, so that the installation across the center console can be conveniently realized, and the accident of steel wire rope breakage is avoided. Furthermore, the needs of both the front passenger for braking and accelerator operation are met, and the effects of simple structure, convenient installation, reliable strength and safety improvement are achieved.

The technical solution used for solving the technical problems of the present disclosure is as follows.

A flexible transmission-based front passenger-side brake control device for a motor vehicle is mounted on a carriage floor and connected with a master brake pedal. The front passenger-side brake control device includes a base assembly, a front passenger-side brake pedal assembly, a master brake pedal clamping assembly, a rotating shaft, a brake return torsional spring, a brake cable, a brake flexible force transmission sleeve and a brake cable fixing plate. The base assembly is fixed to the carriage floor at a front passenger-side position. The rotating shaft penetrates through an upper part of the base assembly. The front passenger-side brake pedal assembly is hinged to the base assembly through the rotating shaft. The brake return torsional spring is arranged between the base assembly and the front passenger-side brake pedal assembly. The master brake pedal clamping assembly is clamped on the master brake pedal. The brake cable fixing plate is fixed to the carriage floor at a driver-side position. The brake flexible force transmission sleeve is an axially incompressible flexible pipe and is loosely connected between the base assembly and the master brake pedal clamping assembly. An end of the brake flexible force transmission sleeve is fixed to the base assembly to form a fixed end of the brake flexible force transmission sleeve, and another end of the brake flexible force transmission sleeve is fixed to the master brake pedal clamping assembly to form a movable end of the brake flexible force transmission sleeve. The brake flexible force transmission sleeve has a sufficient margin in length. The brake cable penetrates through the brake flexible force transmission sleeve. An end of the brake cable is fixedly connected to a lower part of the front passenger-side brake pedal assembly to form a movable end of the brake cable, and another end of the brake cable penetrates through the master brake pedal clamping assembly and is fixedly connected to the brake cable fixing plate to form a fixed end of the brake cable. The brake cable has a sufficient margin in length.

The front passenger-side brake pedal assembly is pressed down to rotate around the rotating shaft, and then the movable end of the brake cable is pulled and a relative position between the movable end of the brake cable and the base assembly is changed, so that a length of the brake cable between the base assembly and the brake cable fixing plate is decreased, the movable end of the brake flexible force transmission sleeve which is incompressible moves along the brake cable by means of a positioning of the fixed end of the brake flexible force transmission sleeve on the base assembly, and the master brake pedal is pushed to move down by the master brake pedal clamping assembly, so as to realize a braking function of the motor vehicle. Pressure on the front passenger-side brake pedal assembly is removed, the front passenger-side brake pedal assembly is pushed to reset by the brake return torsional spring, and the motor vehicle returns to a braking-free state.

As a further improvement, the base assembly includes a base plate, a left side plate, a right side plate and a back plate. A first fixing plate for fixing the brake flexible force transmission sleeve is arranged at a rear part of the base plate vertically. A through hole for the brake cable to pass through is formed on the first fixing plate. The left side plate and the right side plate are symmetrically and vertically fixed to a front part of the base plate. The rotating shaft penetrates through an upper part of the left side plate and an upper part of the right side plate. The back plate is connected between the left side plate and the right side plate.

As a further improvement, the front passenger-side brake pedal assembly includes a brake pedal arm and a brake pedal. A front part of the brake pedal arm is hinged to the upper part of the left side plate and the upper part of the right side plate through the rotating shaft and is capable of rotating, and a lower part of the brake pedal arm is fixedly connected with the movable end of the brake cable. The brake pedal is fixedly arranged at a rear part of the brake pedal arm.

As a further improvement, the front passenger-side brake control device further includes a guide spring. The guide spring is sleeved on the brake cable between the first fixing plate and the front passenger-side brake pedal assembly. An end of the guide spring is fixedly connected to the first fixing plate, and another end of the guide spring is fixedly connected to the lower part of the front passenger-side brake pedal assembly. The base assembly further includes a cover plate, and the cover plate is arranged at the rear part of the base plate and covers the first fixing plate.

As a further improvement, the master brake pedal clamping assembly includes a first universal clamp, a fixing plate, a hollow screw, a roller fixing plate and two rollers. The first universal clamp and the fixing plate are clamped on the master brake pedal through bolts. The hollow screw is connected to the first universal clamp and fixedly connected to the movable end of the brake flexible force transmission sleeve. The roller fixing plate is connected to a lower part of the first universal clamp. The two rollers are arranged on the roller fixing plate and are capable of rotating. The fixed end of the brake cable extends out from the movable end of the brake flexible force transmission sleeve, passes through a center of the hollow screw and passes between the two rollers, and is fixedly connected to the brake cable fixing plate.

As a further improvement, a length of the brake cable is much greater than a linear distance between the front passenger-side brake pedal assembly and the brake cable fixing plate, and a length of the brake flexible force transmission sleeve is much greater than a linear distance between the base assembly and the master brake pedal clamping assembly.

Another technical solution of the present disclosure is as follows.

A flexible transmission-based front passenger-side operating system for a motor vehicle including the front passenger-side brake control device above is mounted on the carriage floor and connected with the master brake pedal and a master accelerator pedal. The front passenger-side operating system includes a front passenger-side brake control device, a master accelerator pedal clamping assembly, a front passenger-side accelerator pedal, an accelerator return torsional spring, an accelerator cable, an accelerator flexible force transmission sleeve and an accelerator cable fixing plate.

A second fixing plate for fixing the accelerator flexible force transmission sleeve is arranged at the rear part of the base plate of the front passenger-side brake control device vertically. A safety pin penetrates through the upper part of the left side plate and the upper part of the right side plate. The safety pin is located below the front passenger-side brake pedal assembly and the front passenger-side accelerator pedal.

The front passenger-side accelerator pedal is hinged to the upper part of the left side plate and the upper part of the right side plate of the base assembly through the rotating shaft. The accelerator return torsional spring is arranged between the base assembly and the front passenger-side accelerator pedal. The master accelerator pedal clamping assembly is clamped on the master accelerator pedal, the accelerator cable fixing plate is fixed to the carriage floor at a driver-side position. The accelerator flexible force transmission sleeve is an axially incompressible flexible pipe and is loosely connected between the base assembly and the master accelerator pedal clamping assembly. An end of the accelerator flexible force transmission sleeve is fixed to the second fixing plate to form a fixed end of the accelerator flexible force transmission sleeve, and another end of the accelerator flexible force transmission sleeve is fixed to the master accelerator pedal clamping assembly to form a movable end of the accelerator flexible force transmission sleeve. The accelerator flexible force transmission sleeve has a sufficient margin in length. The accelerator cable penetrates through the accelerator flexible force transmission sleeve. An end of the accelerator cable is fixedly connected to a lower part of the front passenger-side accelerator pedal to form a movable end of the accelerator cable, and another end of the accelerator cable penetrates through the master accelerator pedal clamping assembly and is fixedly connected to the accelerator cable fixing plate to form a fixed end of the accelerator cable. The accelerator cable has a sufficient margin in length.

The front passenger-side accelerator pedal is pressed down to rotate around the rotating shaft, and then the movable end of the accelerator cable is pulled and a relative position between the movable end of the accelerator cable and the base assembly is changed, so that a length of the accelerator cable between the base assembly and the accelerator cable fixing plate is reduced, the movable end of the accelerator flexible force transmission sleeve which is incompressible moves along the accelerator cable by means of a positioning of the fixed end of the accelerator flexible force transmission sleeve on the second fixing plate of the base assembly, and the master accelerator pedal is pushed to move down by the master accelerator pedal clamping assembly, so as to realize a function of fuel injection for the motor vehicle. The pressure on the front passenger-side accelerator pedal is removed, the front passenger-side accelerator pedal is pushed to reset by the accelerator return torsional spring, and the motor vehicle returns to a fuel cut-off state.

As a further improvement, the master accelerator pedal clamping assembly includes a second universal clamp, a fixing plate, a hollow screw, a roller fixing plate and two rollers. The second universal clamp and the fixing plate are clamped on the master accelerator pedal through bolts. The hollow screw is connected to the second universal clamp and fixedly connected to the movable end of the accelerator flexible force transmission sleeve. The roller fixing plate is connected to a lower part of the second universal clamp. The two rollers are arranged on the roller fixing plate and are capable of rotating. The fixed end of the accelerator cable extends out from the movable end of the accelerator flexible force transmission sleeve, passes through a center of the hollow screw and passes between the two rollers, and is fixedly connected to the accelerator cable fixing plate.

As a further improvement, the front passenger-side operating system further includes another guide spring. The guide spring is sleeved on the accelerator cable between the second fixing plate and the front passenger-side accelerator pedal. An end of the guide spring is fixedly connected to the second fixing plate, and another end of the guide spring is fixedly connected to the lower part of the front passenger-side accelerator pedal. The base assembly further includes a cover plate, and the cover plate is arranged at the rear part of the base plate and covers the first fixing plate and the second fixing plate.

As a further improvement, a length of the brake cable is much greater than a linear distance between the front passenger-side brake pedal assembly and the brake cable fixing plate, and a length of the brake flexible force transmission sleeve is much greater than a linear distance between the first fixing plate and the master brake pedal clamping assembly. A length of the accelerator cable is much greater than a linear distance between the front passenger-side accelerator pedal and the accelerator cable fixing plate, and a length of the accelerator flexible force transmission sleeve is much greater than a linear distance between the second fixing plate and the master accelerator pedal clamping assembly.

Compared with the existing automobile braking device for a front passenger, the front passenger-side brake control device and the front passenger-side operating system achieve the following effects.

Firstly, a flexible force transmission mechanism is adopted. The difficulties in installation caused by a raised center console between the driver-side position and the front passenger-side position are overcome, so that the installation of the device is facilitated. The possible damage to the original vehicle structure caused by the installation is avoided, so that the present disclosure can adapt to all installation occasions of motor vehicles.

Secondly, the steel wire rope is used as a guide component and the axially incompressible high-strength flexible force transmission sleeve is used as a force transmission component, so that the steel wire rope is not stressed. Therefore, the failure of the front passenger-side operating system caused by the breakage of the steel wire rope is avoided, so that the occurrence of accidents is avoided, the reliability and safety of the front passenger-side operating system are significantly improved, and the service life of the device is prolonged.

Thirdly, the automobile operating system for a front passenger can realize the operation of both a master brake and a master accelerator, and has more and more powerful functions.

In a word, the present disclosure has the advantages of simple structure, low cost, high safety, convenience and non-destructive installation, long service life and the like, can adapt to various vehicle models of coach cars, and is especially beneficial to the use of private cars.

1 base plate; 2 left side plate; 3 right side plate; 4 brake pedal arm; 5 brake pedal; 6 cover plate; 7 guide spring; 8 brake flexible force transmission sleeve; 9 first universal clamp; 10 roller; 11 fixing plate; 12 brake return torsional spring; 13 rotating shaft; 14 brake cable fixing plate; 15 roller fixing plate; 16 brake cable; 17 back plate; 18 hollow screw; 19 first fixing plate; 20 master brake pedal; 21 master accelerator pedal; 22 accelerator return torsional spring; 23 front passenger-side accelerator pedal; 24 accelerator cable fixing plate; 25 safety pin; 26 accelerator cable; 27 second universal clamp; 28 accelerator flexible force transmission sleeve; 29 second fixing plate; A carriage floor; and B center console.

DETAILED DESCRIPTION OF THE EMBODIMENTS

The description of the present disclosure is described in detail in conjunction with the following attached figures and specific embodiments, but the protection scope of the present disclosure is not limited to the following embodiments. All equivalent changes and modifications made according to the contents of this specification fall in the technical scope of the patent application of the present disclosure.

The present disclosure is used for controlling and operating a brake and an accelerator by a front passenger of a motor vehicle, and is mounted on a carriage floor of the motor vehicle at a driver-side position and a front passenger-side position. A center console protruding from the carriage floor is arranged between the driver-side position and the front passenger-side position.

First Embodiment

Figure 5:
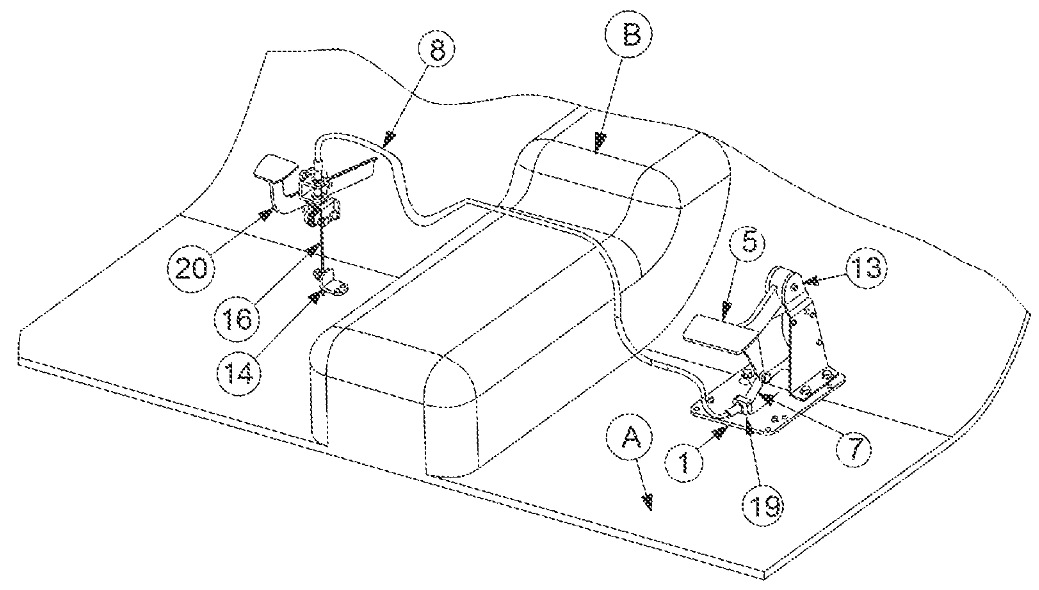
FIG. 5 is a mounting schematic diagram of a first embodiment.

In the embodiment, a flexible transmission-based front passenger-side brake control device for a motor vehicle is mounted on a carriage floor A, referring to FIG. 5, and connected with a master brake pedal 20.

Figure 1:
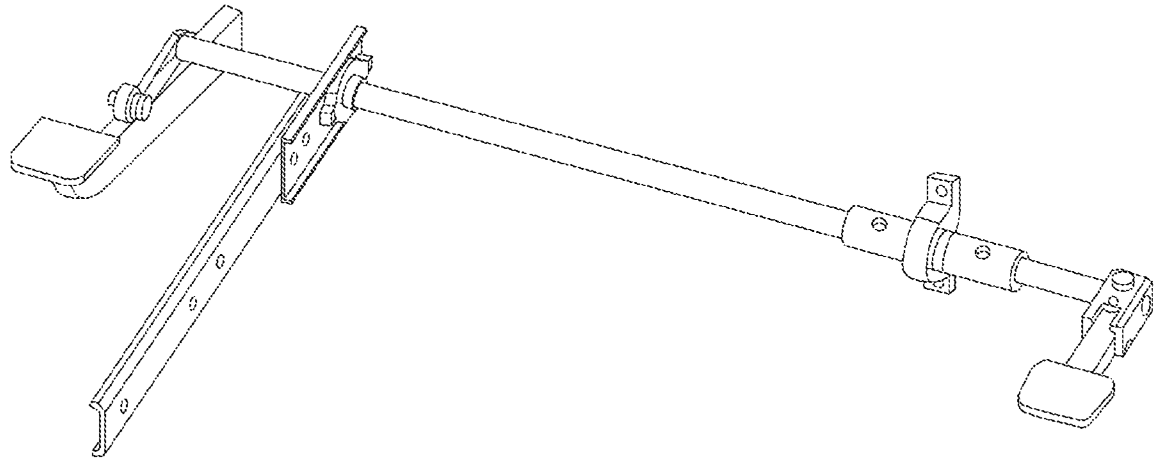
FIG. 1 is a schematic diagram of an existing braking device for a front passenger.
Figure 2:
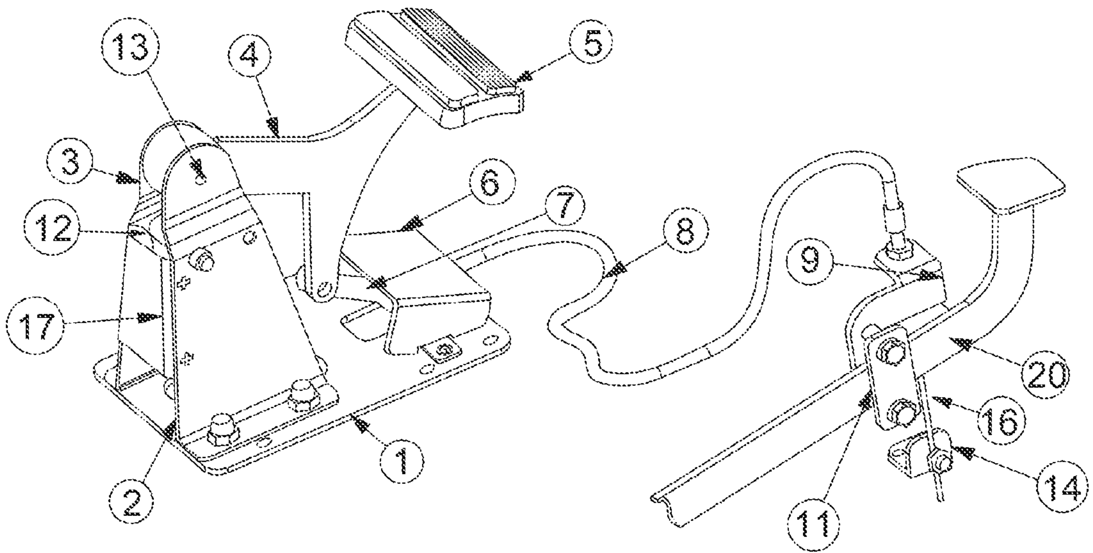
FIG. 2 is a first structural schematic diagram of a first embodiment in the present disclosure.
Figure 3:
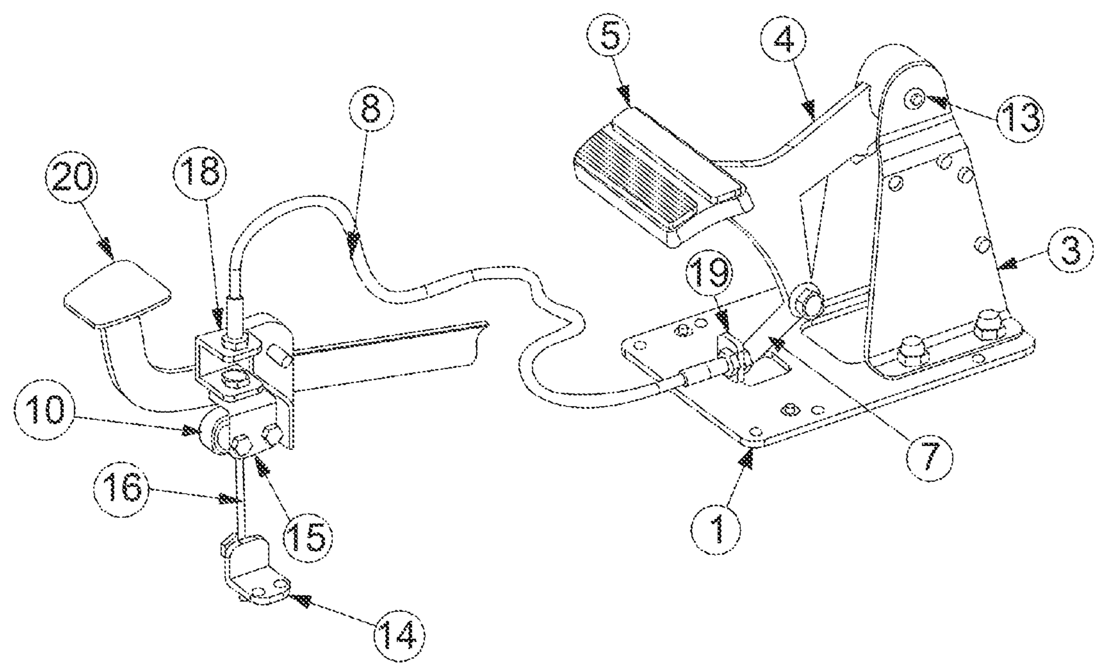
FIG. 3 is a second structural schematic diagram of a first embodiment in the present disclosure.

Referring to FIG. 2 and FIG. 3, the front passenger-side brake control device as shown includes a base assembly, a front passenger-side brake pedal assembly, a master brake pedal clamping assembly, a rotating shaft 13, a brake return torsional spring 12, a brake cable 16, a brake flexible force transmission sleeve 8, a guide spring 7 and a brake cable fixing plate 14.

The base assembly is fixed to the carriage floor A at the front passenger-side position. The rotating shaft 13 penetrates through the upper part of the base assembly. The front passenger-side brake pedal assembly is hinged to the base assembly through the rotating shaft 13. The brake return torsional spring 12 is arranged between the base assembly and the front passenger-side brake pedal assembly.

The base assembly includes a base plate 1, a left side plate 2, a right side plate 3, a cover plate 6 and a back plate 17. The base plate 1 is fixed to the carriage floor A at the front passenger-side position through bolts. Referring to FIG. 3, a first fixing plate 19 for fixing the brake flexible force transmission sleeve 8 is arranged at a rear part of the base plate 1 vertically. A through hole for the brake cable 16 to pass through is formed on the first fixing plate 19. The left side plate 2 and the right side plate 3 are vertically and symmetrically fixed to a front part of the base plate 1 in parallel. The rotating shaft 13 penetrates through the upper parts of the left side plate 2 and the right side plate 3. The back plate 17 is connected between the left side plate 2 and the right side plate 3 to play a reinforcing role. Referring to FIG. 3, the cover plate 6 is fixed at the rear part of the base plate 1 by bolts and covers the first fixing plate 19 to provide protection against dust, water, and touch.

Referring to FIG. 2, the front passenger-side brake pedal assembly includes a brake pedal arm 4 and a brake pedal 5. A front part of the brake pedal arm 4 is hinged to the upper parts of the left side plate 2 and the right side plate 3 through the rotating shaft 13 and is capable of rotating. The brake pedal 5 is fixedly arranged at a rear part of the brake pedal arm 4.

The brake return torsional spring 12 is sleeved on the rotating shaft 13. An end of the brake return torsional spring 12 is connected with the left side plate 2 or the right side plate 3, and another end of the brake return torsional spring 12 abuts against the brake pedal arm 4 to provide reset elastic force for the front passenger-side brake pedal assembly.

The brake cable fixing plate 14 is fixed to the carriage floor A at a driver-side position. Referring to FIG. 5, the master brake pedal clamping assembly is clamped on the master brake pedal 20.

Figure 4:
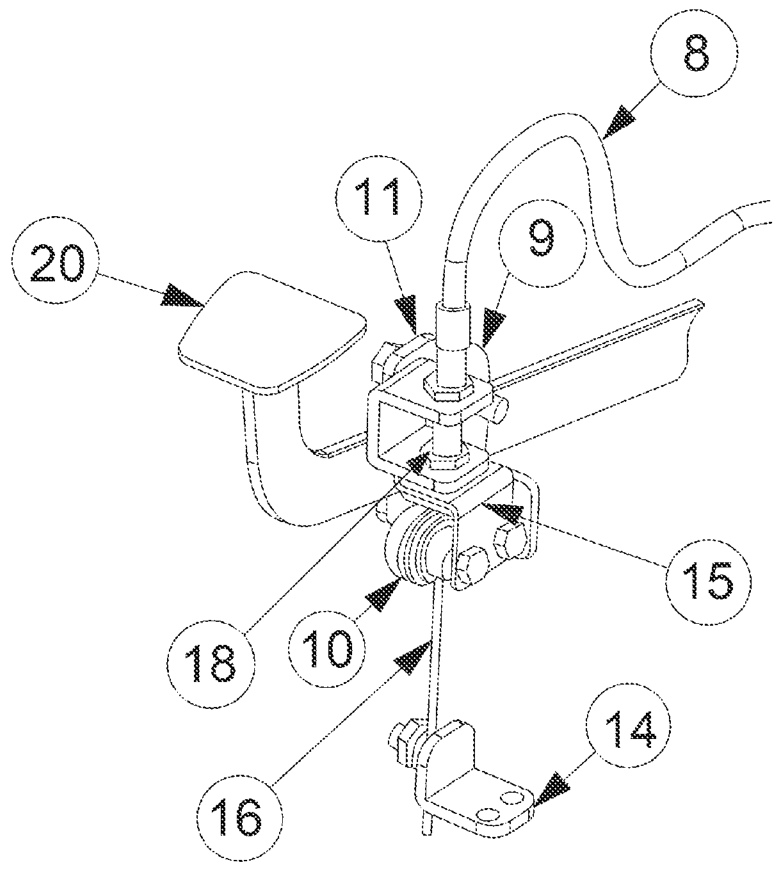
FIG. 4 is a local schematic diagram of FIG. 3.

Referring to FIG. 4, the master brake pedal clamping assembly includes a first universal clamp 9, a fixing plate 11, a hollow screw 18, a roller fixing plate 15 and two rollers 10.

The first universal clamp 9 and the fixing plate 11 are clamped on the master brake pedal 20 through bolts. The hollow screw 18 is connected to the first universal clamp 9. The roller fixing plate 15 is connected to a lower part of the first universal clamp 9 through screws. The two rollers 10 are arranged on the roller fixing plate 15 and are capable of rotating.

The brake flexible force transmission sleeve 8 is an axially incompressible high-strength flexible pipe, and can be a metal hose, a corrugated pipe, a stainless steel wire hose or a stainless steel spring hose. The brake flexible force transmission sleeve 8 crosses a center console B. Referring to FIG. 5, the brake flexible force transmission sleeve 8 is loosely connected between the base assembly and the master brake pedal clamping assembly. Referring to FIG. 3, an end of the brake flexible force transmission sleeve 8 is fixed to the first fixing plate 19 of the base plate 1 to form a fixed end of the brake flexible force transmission sleeve 8, and another end of the brake flexible force transmission sleeve 8 is fixed to the first universal clamp 9 of the master brake pedal clamping assembly to form a movable end of the brake flexible force transmission sleeve 8. The length of the brake flexible force transmission sleeve 8 is much greater than the linear distance between the first fixing plate 19 of the base assembly and the first universal clamp 9 of the master brake pedal clamping assembly. The brake flexible force transmission sleeve 8 has a sufficient margin in length.

Referring to FIG. 3, the brake cable 16 can be a steel wire rope, and penetrates through the brake flexible force transmission sleeve 8. An end of the brake cable 16 is fixedly connected to the lower part of the brake pedal arm 4 of the front passenger-side brake pedal assembly to form a movable end of the brake cable 16, and another end of the brake cable 16 extends out from the movable end of the brake flexible force transmission sleeve 8, passes through the center of the hollow screw 18 and passes between the two rollers 10, and is fixedly connected to the brake cable fixing plate 14 to form a fixed end of the brake cable 16. The length of the brake cable 16 is much greater than the linear distance between the brake pedal arm 4 and the brake cable fixing plate 14. The brake cable 16 has a sufficient margin in length.

The guide spring 7 plays a guiding role on the brake cable. The guide spring 7 is sleeved on the brake cable 16 between the first fixing plate 19 and the front passenger-side brake pedal assembly. An end of the guide spring 7 is fixedly connected with the first fixing plate 19, and another end of the guide spring 7 is fixedly connected to the lower part of the brake pedal arm 4.

Figure 6:
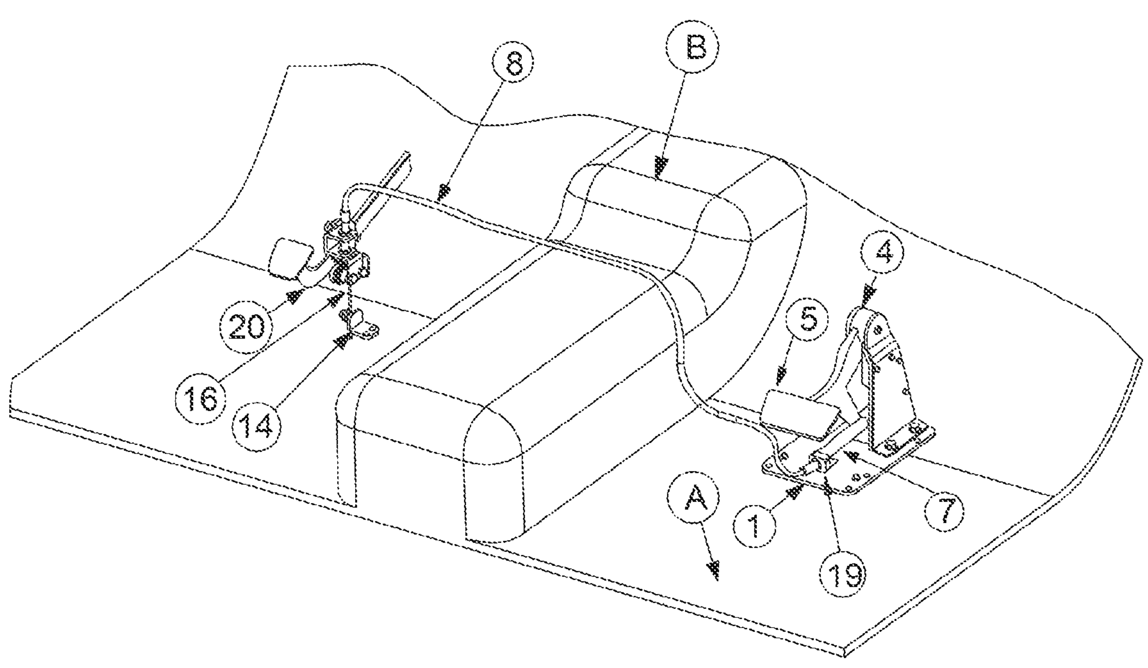
FIG. 6 is a working schematic diagram of a first embodiment.

Referring to FIG. 6, the working principle of the flexible transmission-based front passenger-side brake control device for a motor vehicle is as follows.

When a front passenger presses on the brake pedal 5, the front passenger-side brake pedal assembly is pressed down to rotate around the rotating shaft 13, and then the movable end of the brake cable 16 is pulled by the brake pedal arm 4, so that a relative position between the movable end of the brake cable 16 and the first fixing plate 19 on the base plate 1 is changed. The length of the brake cable 16 between the first fixing plate 19 and the brake pedal arm 4 is increased, and the length of the brake cable 16 between the first fixing plate 19 and the brake cable fixing plate 14 is decreased. The brake flexible force transmission sleeve 8 is axially (longitudinally) incompressible, so the relative position between the brake flexible force transmission sleeve 8 and the brake cable 16 is changed by means of a positioning of the fixed end, which is immovable, of the brake flexible force transmission sleeve 8 on the first fixing plate 19 of the base plate 1. Therefore, the movable end of the brake flexible force transmission sleeve 8 fixed on the first universal clamp 9 moves downward along the surface of the brake cable 16, and the master brake pedal 20 is pushed downward by the master brake pedal clamping assembly, so as to realize a braking function of the motor vehicle. During this process, the brake cable 16 between the first fixing plate 19 and the brake cable fixing plate 14 becomes tensioned from a loose condition, and the length is relatively decreased, so that the brake cable 16 and the brake flexible force transmission sleeve 8 has a sufficient margin in length and can initially achieve the loose condition, which is an indispensable condition for realizing the present disclosure.

The front passenger lifts the foot to remove the pressure on the brake pedal 5. The front passenger-side brake pedal assembly is pushed to reset by the brake return torsional spring 12, so that the motor vehicle returns to a braking-free state.

Second Embodiment

Figure 9:
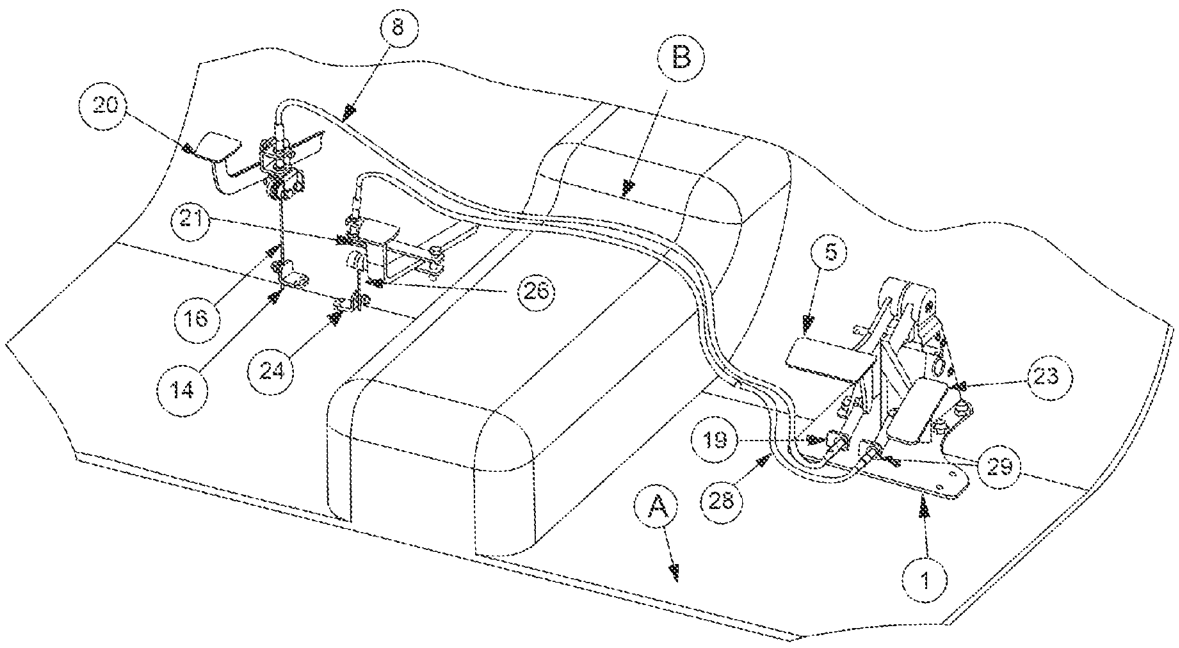
FIG. 9 is a mounting schematic diagram of a second embodiment.

In the embodiment, a flexible transmission-based front passenger-side operating system for a motor vehicle is mounted on a carriage floor A, referring to FIG. 9, and is connected with a master brake pedal 20 and a master accelerator pedal 21.

The structure in the embodiment is expanded on the basis of the structure in first embodiment.

Figure 7:
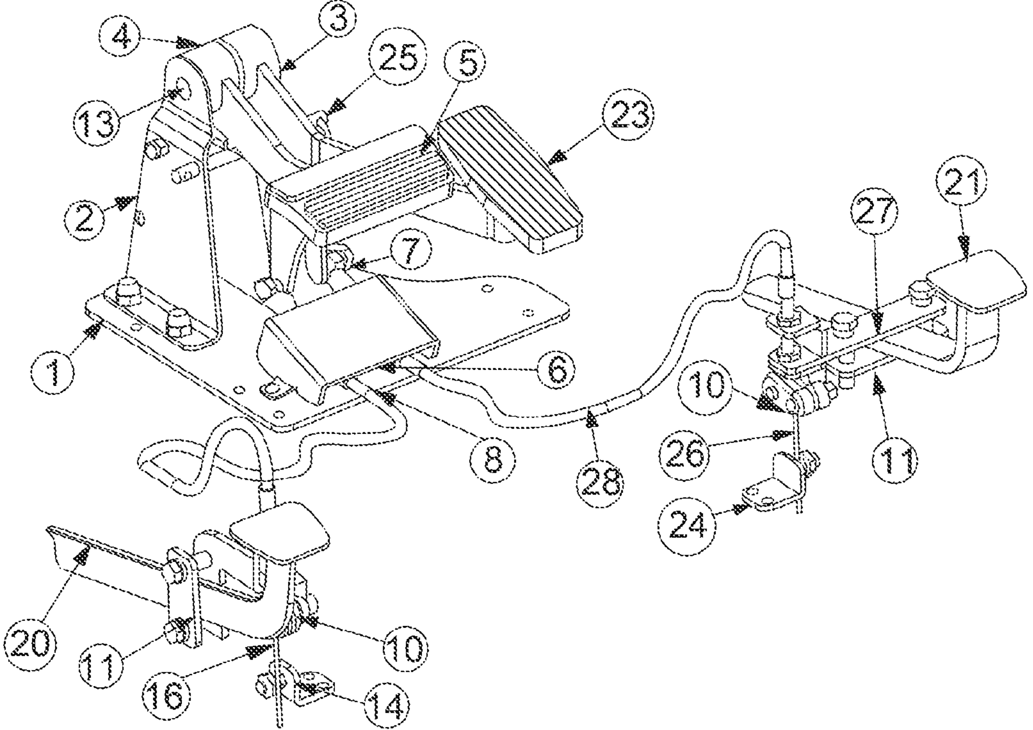
FIG. 7 is a first structural schematic diagram of a second embodiment in the present disclosure.
Figure 8:
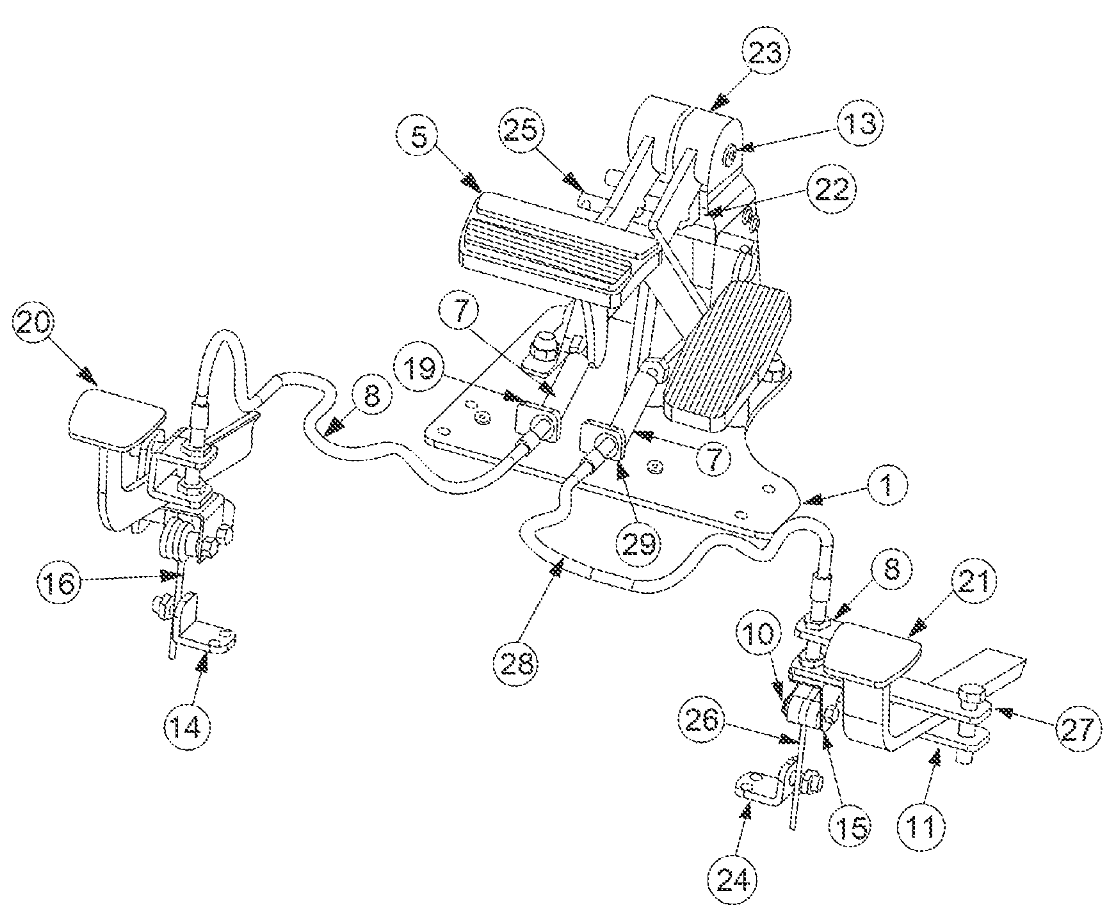
FIG. 8 is a second structural schematic diagram of a second embodiment in the present disclosure.

Referring to FIG. 7 and FIG. 8, the front passenger-side operating system includes a master accelerator pedal clamping assembly, a front passenger-side accelerator pedal 23, an accelerator return torsional spring 22, an accelerator cable 26, an accelerator flexible transmission sleeve 28, an accelerator cable fixing plate 24, and the front passenger-side brake control device in the first embodiment.

The front passenger-side brake control device includes a base assembly, a front passenger-side brake pedal assembly, a master brake pedal clamping assembly, a rotating shaft 13, a brake return torsional spring 12, a brake cable 16, a brake flexible force transmission sleeve 8, a guide spring 7 and a brake cable fixing plate 14. The base assembly includes a base plate 1, a left side plate 2, a right side plate 3, a cover plate 6 and a back plate 17. The front passenger-side brake pedal assembly includes a brake pedal arm 4 and a brake pedal 5. The master brake pedal clamping assembly includes a first universal clamp 9, a fixing plate 11, a hollow screw 18, a roller fixing plate 15 and two rollers 10.

A second fixing plate 29 for fixing the accelerator flexible force transmission sleeve 28 is arranged at the rear part of the base plate 1 vertically. The cover plate 6 is arranged at the rear part of the base plate 1 and covers the first fixing plate 19 and the second fixing plate 29. The front passenger-side accelerator pedal 23 is hinged to the upper parts of the left side plate 2 and the right side plate 3 through the rotating shaft 13. The accelerator return torsional spring 22 is arranged between the base assembly and the front passenger-side accelerator pedal 23. The accelerator return torsional spring 22 is sleeved on the rotating shaft 13. An end of the accelerator return torsional spring 22 is connected with the left side plate 2 or the right side plate 3, and another end of the accelerator return torsional spring 22 abuts against the front passenger-side accelerator pedal 23 to provide reset elastic force for the front passenger-side accelerator pedal 23. A safety pin 25 penetrates through the upper parts of the left side plate 2 and the right side plate 3. The safety pin 25 is located below the brake pedal arm 4 and the front passenger-side accelerator pedal 23, so that the front passenger-side operating system is locked when it is not in use.

The accelerator cable fixing plate 24 is fixed to a carriage floor A at a driver-side position. Referring to FIG. 9, the master accelerator pedal clamping assembly is clamped on the master accelerator pedal 21.

Referring to FIG. 7, the master accelerator pedal clamping assembly includes a second universal clamp 27, a fixing plate 11, a hollow screw 18, a roller fixing plate 15 and two rollers 10. The second universal clamp 27 and the fixing plate 11 are clamped on the master accelerator pedal 21 through bolts. The hollow screw 18 is connected to the second universal clamp 27 and fixedly connected to the movable end of the accelerator flexible force transmission sleeve 28. The roller fixing plate 15 is connected to a lower part of the second universal clamp 27 through screws. The two rollers 10 are arranged on the roller fixing plate 15 and are capable of rotating.

The accelerator flexible force transmission sleeve 28 is an axially incompressible high-strength flexible pipe, and can be a metal hose, a corrugated pipe, a stainless steel wire hose or a stainless steel spring hose. The accelerator flexible force transmission sleeve 28 crosses over a center console B. Referring to FIG. 9, the accelerator flexible force transmission sleeve 28 is loosely connected between the base assembly and the master accelerator pedal clamping assembly. Referring to FIG. 8, an end of the accelerator flexible force transmission sleeve 28 is fixed to the second fixing plate 29 of the base plate 1 to form a fixed end of the accelerator flexible force transmission sleeve 28, and another end of the accelerator flexible force transmission sleeve 28 is fixed to the second universal clamp 27 of the master accelerator pedal clamping assembly to form a movable end of the accelerator flexible force transmission sleeve 28. The length of the accelerator flexible force transmission sleeve 28 is much greater than the linear distance between the second fixing plate 29 and the second universal clamp 27. The accelerator flexible force transmission sleeve 28 has a sufficient margin in length.

Referring to FIG. 8, the accelerator cable 26 can be a steel wire rope, and penetrates through the accelerator flexible force transmission sleeve 28. An end of the accelerator cable 26 is fixedly connected to the lower part of the front passenger-side accelerator pedal 23 to form a movable end of the accelerator cable 26, and another end of the accelerator cable 26 extends out from the movable end of the accelerator flexible force transmission sleeve 28, passes through the center of the hollow screw 18 and passes between the two rollers 10, referring to FIG. 7, and is fixedly connected to the accelerator cable fixing plate 24 to form a fixed end of the accelerator cable 26. The length of the accelerator cable 26 is much greater than the linear distance between the front passenger-side accelerator pedal 23 and the accelerator cable fixing plate 24. The accelerator cable 26 has a sufficient margin in length.

The guide spring 7 is sleeved on the accelerator cable 26 between the second fixing plate 29 and the front passenger-side accelerator pedal 23. An end of the guide spring 7 is fixedly connected with the second fixing plate 29, and another end of the guide spring 7 is fixedly connected to the lower part of the front passenger-side accelerator pedal 23 to play a guiding role on the accelerator cable 26.

Referring to FIG. 9, the working principle of the flexible transmission-based front passenger-side operating system for a motor vehicle is as follows.

The realization of the braking function is the same as that in the first embodiment. The realization process of an accelerator function is as follows.

When a front passenger presses on the front passenger-side accelerator pedal 23, the front passenger-side accelerator pedal 23 is pressed down to rotate around the rotating shaft 13, and then the movable end of the accelerator cable 26 is pulled, so that a relative position between the movable end of the accelerator cable 26 and the second fixing plate 29 on the base plate 1 is changed. The length of the accelerator cable 26 between the second fixing plate 29 and the front passenger-side accelerator pedal 23 is increased, and the length of the accelerator cable 26 between the second fixing plate 29 and the accelerator cable fixing plate 24 is decreased. The accelerator flexible force transmission sleeve 28 is axially (longitudinally) incompressible, so the relative position between the accelerator flexible force transmission sleeve 28 and the accelerator cable 26 is changed by means of the positioning of the fixed end, which is immovable, of the accelerator flexible force transmission sleeve 28 on the second fixing plate 29 of the base plate 1. Therefore, the movable end of the accelerator flexible force transmission sleeve 28 fixed on the second universal clamp 27 moves downward along the surface of the accelerator cable 26, and the master accelerator pedal 21 is pushed downward by the master accelerator pedal clamping assembly, so as to realize a function of fuel injection for the motor vehicle. During this process, the accelerator cable 16 between the second fixing plate 29 and the accelerator cable fixing plate 24 becomes tensioned from a loose condition, and the length is relatively decreased, so that like the brake cable 16 and the brake flexible force transmission sleeve 8, the accelerator cable 26 and the accelerator flexible force transmission sleeve 28 has a sufficient margin in length and can initially achieve the loose condition, which is an indispensable condition for realizing the present disclosure as well. The front passenger lifts the foot to remove the pressure on the front passenger-side accelerator pedal 23. The front passenger-side accelerator pedal 23 is pushed to reset by the accelerator return torsional spring 22, so that the motor vehicle returns to a fuel cut-off state.

The scope of protection claimed by the present disclosure is not limited to the above-described embodiments, but should also include other variations and alternatives that are apparent to the present disclosure.

What is claimed is:

1. A flexible transmission-based front (Currently passenger-side brake control device for a motor vehicle, mounted on a carriage floor and connected with a master brake pedal, wherein the front passenger-side brake control device comprises a base assembly, a front passenger-side brake pedal assembly, a master brake pedal clamping assembly, a rotating shaft, a brake return torsional spring, a brake cable, a brake flexible force transmission sleeve and a brake cable fixing plate; the base assembly is fixed to the carriage floor at a front passenger-side position, the rotating shaft penetrates through an upper part of the base assembly, the front passenger-side brake pedal assembly is hinged to the base assembly through the rotating shaft, the brake return torsional spring is arranged between the base assembly and the front passenger-side brake pedal assembly, the master brake pedal clamping assembly is clamped on the master brake pedal, the brake cable fixing plate is fixed to the carriage floor at a driver-side position, the brake flexible force transmission sleeve is an axially incompressible flexible pipe and is loosely connected between the base assembly and the master brake pedal clamping assembly, an end of the brake flexible force transmission sleeve is fixed to the base assembly to form a fixed end of the brake flexible force transmission sleeve, another end of the brake flexible force transmission sleeve is fixed to the master brake pedal clamping assembly to form a movable end of the brake flexible force transmission sleeve, the brake flexible force transmission sleeve has a sufficient margin in length, the brake cable penetrates through the brake flexible force transmission sleeve, an end of the brake cable is fixedly connected to a lower part of the front passenger-side brake pedal assembly to form a movable end of the brake cable, another end of the brake cable penetrates through the master brake pedal clamping assembly and is fixedly connected to the brake cable fixing plate to form a fixed end of the brake cable, and the brake cable has a sufficient margin in length.

2. The flexible transmission-based front passenger-side brake control device for a motor vehicle according to claim 1, wherein the base assembly comprises a base plate, a left side plate, a right side plate and a back plate, a first fixing plate for fixing the brake flexible force transmission sleeve is arranged at a rear part of the base plate vertically, a through hole for the brake cable to pass through is formed on the first fixing plate, the left side plate and the right side plate are symmetrically and vertically fixed to a front part of the base plate, the rotating shaft penetrates through an upper part of the left side plate and an upper part of the right side plate, and the back plate is connected between the left side plate and the right side plate.

3. The flexible transmission-based front passenger-side brake control device for a motor vehicle according to claim 2, wherein the front passenger-side brake pedal assembly comprises a brake pedal arm and a brake pedal, a front part of the brake pedal arm is hinged to the upper part of the left side plate and the upper part of the right side plate through the rotating shaft and is capable of rotating, a lower part of the brake pedal arm is fixedly connected with the movable end of the brake cable, and the brake pedal is fixedly arranged at a rear part of the brake pedal arm.

4. The flexible transmission-based front passenger-side brake control device for a motor vehicle according to claim 2, wherein the front passenger-side brake control device further comprises a guide spring, the guide spring is sleeved on the brake cable between the first fixing plate and the front passenger-side brake pedal assembly, an end of the guide spring is fixedly connected to the first fixing plate, and another end of the guide spring is fixedly connected to the lower part of the front passenger-side brake pedal assembly; and the base assembly further comprises a cover plate, and the cover plate is arranged at the rear part of the base plate and covers the first fixing plate.

5. The flexible transmission-based front passenger-side brake control device for a motor vehicle according to claim 2, wherein the master brake pedal clamping assembly comprises a first universal clamp, a fixing plate, a hollow screw, a roller fixing plate and two rollers, the first universal clamp and the fixing plate are clamped on the master brake pedal through bolts, the hollow screw is connected to the first universal clamp and fixedly connected to the movable end of the brake flexible force transmission sleeve, the roller fixing plate is connected to a lower part of the first universal clamp, the two rollers are arranged on the roller fixing plate and are capable of rotating, the fixed end of the brake cable extends out from the movable end of the brake flexible force transmission sleeve, passes through a center of the hollow screw and passes between the two rollers, and is fixedly connected to the brake cable fixing plate.

6. The flexible transmission-based front passenger-side brake control device for a motor vehicle according to claim 1, wherein a length of the brake cable is much greater than a linear distance between the front passenger-side brake pedal assembly and the brake cable fixing plate, and a length of the brake flexible force transmission sleeve is much greater than a linear distance between the base assembly and the master brake pedal clamping assembly.

7. A flexible transmission-based front passenger-side operating system for a motor vehicle, comprising the front passenger-side brake control device according to claim 2, mounted on the carriage floor and connected with the master brake pedal and a master accelerator pedal, wherein the front passenger-side operating system comprises a front passenger-side brake control device, a master accelerator pedal clamping assembly, a front passenger-side accelerator pedal, an accelerator return torsional spring, an accelerator cable, an accelerator flexible force transmission sleeve and an accelerator cable fixing plate;

a second fixing plate for fixing the accelerator flexible force transmission sleeve is arranged at the rear part of the base plate of the front passenger-side brake control device vertically, a safety pin penetrates through the upper part of the left side plate and the upper part of the right side plate, and the safety pin is located below the front passenger-side brake pedal assembly and the front passenger-side accelerator pedal;

the front passenger-side accelerator pedal is hinged to the upper part of the left side plate and the upper part of the right side plate of the base assembly through the rotating shaft, the accelerator return torsional spring is arranged between the base assembly and the front passenger-side accelerator pedal, the master accelerator pedal clamping assembly is clamped on the master accelerator pedal, the accelerator cable fixing plate is fixed to the carriage floor at a driver-side position, the accelerator flexible force transmission sleeve is an axially incompressible flexible pipe and is loosely connected between the base assembly and the master accelerator pedal clamping assembly, an end of the accelerator flexible force transmission sleeve is fixed to the second fixing plate to form a fixed end of the accelerator flexible force transmission sleeve, another end of the accelerator flexible force transmission sleeve is fixed to the master accelerator pedal clamping assembly to form a movable end of the accelerator flexible force transmission sleeve, the accelerator flexible force transmission sleeve has a sufficient margin in length, the accelerator cable penetrates through the accelerator flexible force transmission sleeve, an end of the accelerator cable is fixedly connected to a lower part of the front passenger-side accelerator pedal to form a movable end of the accelerator cable, another end of the accelerator cable penetrates through the master accelerator pedal clamping assembly and is fixedly connected to the accelerator cable fixing plate to form a fixed end of the accelerator cable, and the accelerator cable has a sufficient margin in length.

8. The flexible transmission-based front passenger-side operating system for a motor vehicle according to claim 7, wherein the master accelerator pedal clamping assembly comprises a second universal clamp, a fixing plate, a hollow screw, a roller fixing plate and two rollers, the second universal clamp and the fixing plate are clamped on the master accelerator pedal through bolts, the hollow screw is connected to the second universal clamp and fixedly connected to the movable end of the accelerator flexible force transmission sleeve, the roller fixing plate is connected to a lower part of the second universal clamp, the two rollers are arranged on the roller fixing plate and are capable of rotating, the fixed end of the accelerator cable extends out from the movable end of the accelerator flexible force transmission sleeve, passes through a center of the hollow screw and passes between the two rollers, and is fixedly connected to the accelerator cable fixing plate.

9. The flexible transmission-based front passenger-side operating system for a motor vehicle according to claim 7, wherein the front passenger-side operating system further comprises another guide spring, the guide spring is sleeved on the accelerator cable between the second fixing plate and the front passenger-side accelerator pedal, an end of the guide spring is fixedly connected to the second fixing plate, and another end of the guide spring is fixedly connected to the lower part of the front passenger-side accelerator pedal; and the base assembly further comprises a cover plate, and the cover plate is arranged at the rear part of the base plate and covers the first fixing plate and the second fixing plate.

10. The flexible transmission-based front passenger-side operating system for a motor vehicle according to claim 7, wherein a length of the brake cable is much greater than a linear distance between the front passenger-side brake pedal assembly and the brake cable fixing plate, and a length of the brake flexible force transmission sleeve is much greater than a linear distance between the first fixing plate and the master brake pedal clamping assembly; and a length of the accelerator cable is much greater than a linear distance between the front passenger-side accelerator pedal and the accelerator cable fixing plate, and a length of the accelerator flexible force transmission sleeve is much greater than a linear distance between the second fixing plate and the master accelerator pedal clamping assembly.

* * * * *